(12) United States Patent
Karimi et al.

(10) Patent No.: US 11,359,990 B2
(45) Date of Patent: Jun. 14, 2022

(54) LEAK DETECTOR

(71) Applicant: KING ABDULLAH UNIVERSITY OF SCIENCE AND TECHNOLOGY, Thuwal (SA)

(72) Inventors: Muhammad Akram Karimi, Thuwal (SA); Atif Shamim, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 17/059,781

(22) PCT Filed: Jun. 11, 2019

(86) PCT No.: PCT/IB2019/054877
§ 371 (c)(1),
(2) Date: Nov. 30, 2020

(87) PCT Pub. No.: WO2019/239327
PCT Pub. Date: Dec. 19, 2019

(65) Prior Publication Data
US 2021/0208019 A1    Jul. 8, 2021

Related U.S. Application Data

(60) Provisional application No. 62/795,688, filed on Jan. 23, 2019, provisional application No. 62/685,417, filed on Jun. 15, 2018.

(51) Int. Cl.
*G01M 3/18* (2006.01)
(52) U.S. Cl.
CPC .................................. *G01M 3/183* (2013.01)

(58) Field of Classification Search
None
See application file for complete search history.

(56) References Cited

U.S. PATENT DOCUMENTS 3,260,280 A * 7/1966 Buczala ................ F16L 55/178
138/97
5,461,904 A * 10/1995 Baker .................. G01M 3/2853
277/320

(Continued)

FOREIGN PATENT DOCUMENTS

EP        1503218 A1    2/2005
WO    2009088505 A1    7/2009

OTHER PUBLICATIONS

"Stripline", Wikipedia, downloaded Feb. 11, 2019, 3 pages, (https://en.wikipedia.org/wiki/Stripline).
(Continued)

*Primary Examiner* — Paul M. West
*Assistant Examiner* — Mark A Shabman
(74) *Attorney, Agent, or Firm* — Patent Portfolio Builders PLLC

(57) ABSTRACT

A leak detector includes a leak sensor. The leak sensor includes a bottom ground plane, a porous bottom dielectric substrate arranged on the bottom ground plane, a conductor arranged on the porous bottom substrate, a top dielectric substrate arranged on the conductor, and a top ground plane arranged on the top dielectric substrate. The leak detector also includes readout circuitry electrically coupled to the conductor. The readout circuitry is configured to measure a change in electrical properties in at least the porous bottom dielectric substrate.

20 Claims, 9 Drawing Sheets

(56) References Cited

U.S. PATENT DOCUMENTS

| | | | |
|---|---|---|---|
| 6,550,499 B1* | 4/2003 | Pai | F16L 11/12 |
| | | | 138/104 |
| 2016/0273995 A1* | 9/2016 | Dandekar | G01M 3/002 |

OTHER PUBLICATIONS

Adelos, Inc., "Phosonic," downloaded Feb. 11, 2019, 2 pages, (http://www.adelosinc.com/wp-content/uploads/sites/3/2017/08/Adelos_Phosonic_SS-OilGas-FINAL-noBleed.pdf).

Fiedler, J., "An Overview of Pipeline Leak Detection Technologies," American School of Gas Measurement Technology, Feb. 2016, pp. 1-9.

International Search Report in corresponding/related International Application No. PCT/IB2019/054877, dated Sep. 19, 2019.

Microchip, "CAP1203—Touch and Input Sensing—Capacitive Touch Sensors," downloaded Feb. 11, 2019, pp. 1-3, (http://www.microchip.com/wwwproducts/en/CAP1203).

Microwaves101, "Light, Phase and Group Velocities," downloaded Feb. 11, 2019, pp. 1-4, (https://www.microwaves101.com/encyclopedias/light-phase-and-group-velocities).

Written Opinion of the International Searching Authority in corresponding/related International Application No. PCT/IB2019/054877, dated Sep. 19, 2019.

* cited by examiner

LEAK DETECTOR

CROSS-REFERENCE TO RELATED APPLICATIONS

This application is a U.S. National Stage Application of International Application No. PCT/162019/054877, filed on Jun. 11, 2019, claims priority to U.S. Provisional Patent Application No. 62/685,417, filed on Jun. 15, 2018, entitled "WIRELESS LEAK DETECTOR FOR CONTINUOUS LEAKAGE MONITORING OF CRITICAL LOCATIONS IN PIPELINES," and U.S. Provisional Patent Application No. 62/795,688, filed on Jan. 23, 2019, entitled "SMART CLAMP-TYPE MICROWAVE SENSOR FOR ACCIDENTAL LEAK DETECTION FROM PIPE JOINTS," the disclosures of which are incorporated herein by reference in their entirety.

BACKGROUND

Technical Field

Embodiments of the subject matter disclosed herein generally relate to a leak detector, and more specifically to a leak detector that can directly detect leaking fluid (i.e., liquid or gas).

Discussion of the Background

Pipelines are a commonly used to transport any number of different fluids, such as water, oil, and natural gas. As with any mechanical structure, pipelines can be subject to leaks. Leaks are a low-probability but high-impact events for pipelines. Accordingly, there have been a number of techniques developed to monitor pipelines for leaks. One technique involves using a fiber optical line to monitor for temperature abnormalities that may be indicative of a leak. This technique, however, covers only a limited length of the pipe in the pipeline and also incurs high costs. Another technique involves monitoring the pipeline for any vibrations or sound waves that would emanate from a leak in the pipeline. This technique is highly dependent on process parameters, such as pipe diameter, material, and medium. Further, noise from a pump or nearby traffic can trigger false indications of a leak, thus incurring unnecessary expenses for personnel to visit a location of an identified leak that is not actually leaking.

Other techniques analyze data from existing field instruments such as pressure, temperature and flow sensors to identify pressure/temperature changes or mass imbalance between two locations to predict a leakage. However, these techniques are only valid and reliable if the leakage size is as significant as 5-6% of the total flow rate. Thus, current techniques for detecting pipeline leaks are expensive, subject to false positive indications of leaks, or require the leaks to be of a sufficiently significant size. Further, current techniques for detecting pipeline leaks rely upon indirect measurements that are indicative of a leak and do not employ actual measurement of the leaked fluid.

Thus, there is a need for an inexpensive and accurate leak detector that can detect a leak based on a relatively small amount of leaked fluid.

SUMMARY

According to an embodiment, there is a leak detector, which includes a leak sensor. The leak sensor includes a bottom ground plane, a porous bottom dielectric substrate arranged on the bottom ground plane, a conductor arranged on the porous bottom substrate, a top dielectric substrate arranged on the conductor, and a top ground plane arranged on the top dielectric substrate. The leak detector also includes readout circuitry electrically coupled to the conductor. The readout circuitry is configured to measure a change in electrical properties in at least the porous bottom dielectric substrate.

According to another embodiment, there is a leak detection system, which includes first and second flanges spaced apart by a gasket and a leak sensor. The leak sensor includes a bottom ground plane formed by the first and second flanges, a porous bottom dielectric substrate arranged on the bottom ground plane, a conductor arranged on the porous bottom substrate, a top dielectric substrate arranged on the conductor, and a top ground plane arranged on the top dielectric substrate. The top ground plane is a clamp that clamps the leak sensor to the first and second flanges so that a space between the first and second flanges is protected from an environment external to the leak sensor. The leak detection system also includes readout circuitry electrically coupled to the conductor. The readout circuitry is configured to measure a change in electrical properties in at least the porous bottom dielectric substrate. The leak detection system further includes a wireless transmitter coupled to the readout circuitry. The wireless transmitter is configured to transmit an indication of the change in electrical properties in at least the porous bottom dielectric substrate.

According to a further embodiment, there is a method for detecting leaks. A leak sensor is arranged on a structure carrying fluids. The leak sensor includes a bottom ground plane, a porous bottom dielectric substrate arranged on the bottom ground plane, a conductor arranged on the porous bottom substrate, a top dielectric substrate arranged on the conductor, and a top ground plane arranged on the top dielectric substrate. Leaked fluid is absorbed by the porous bottom dielectric substrate, the absorbed leaked fluid modifying electrical properties of the porous bottom substrate. A leak is detected based on a change in electrical properties in at least the porous bottom dielectric substrate.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of leak detector.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
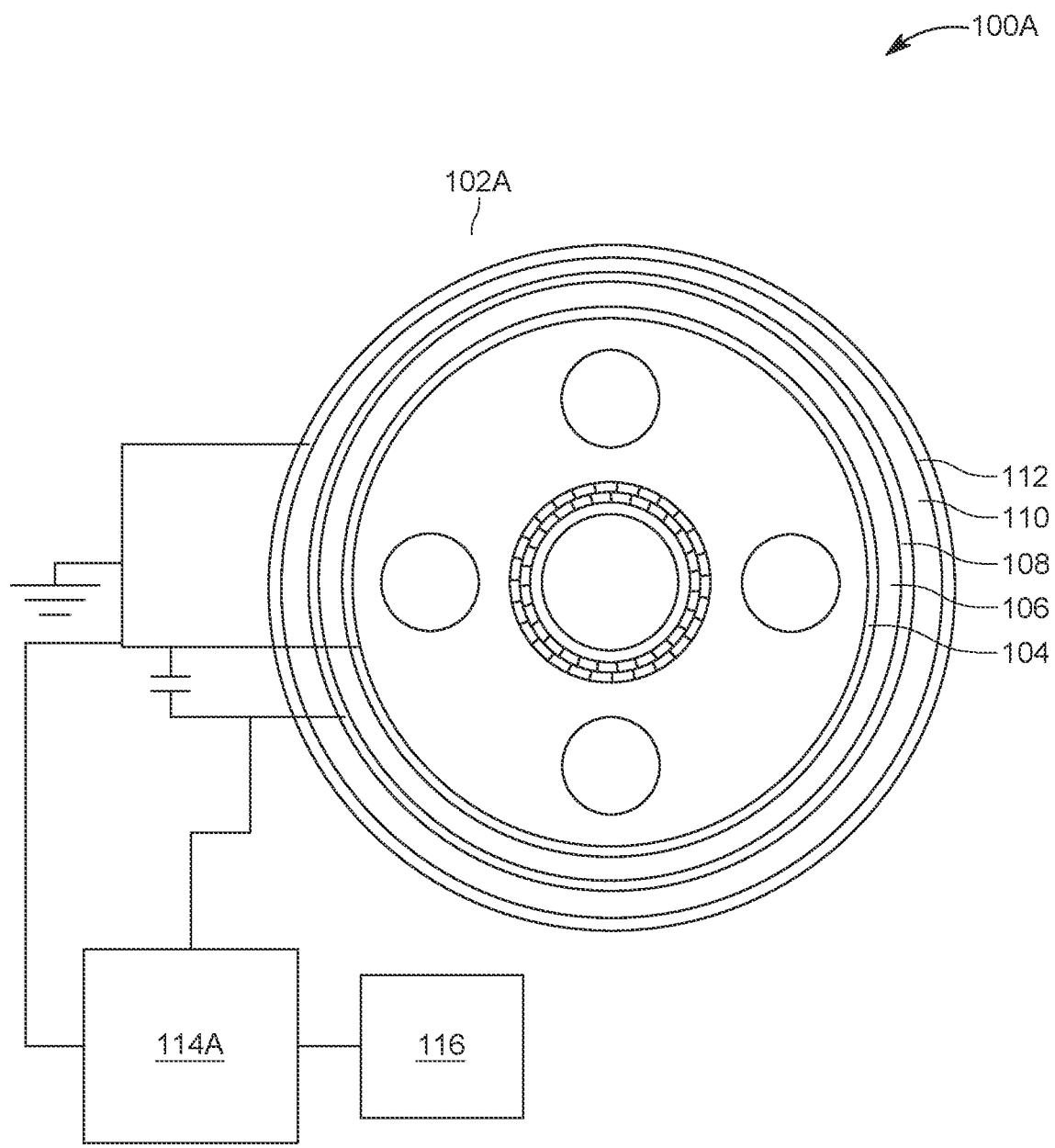
FIGS. 1A-1C are schematic diagrams of a leak detector according to embodiments.
Figure 1B:
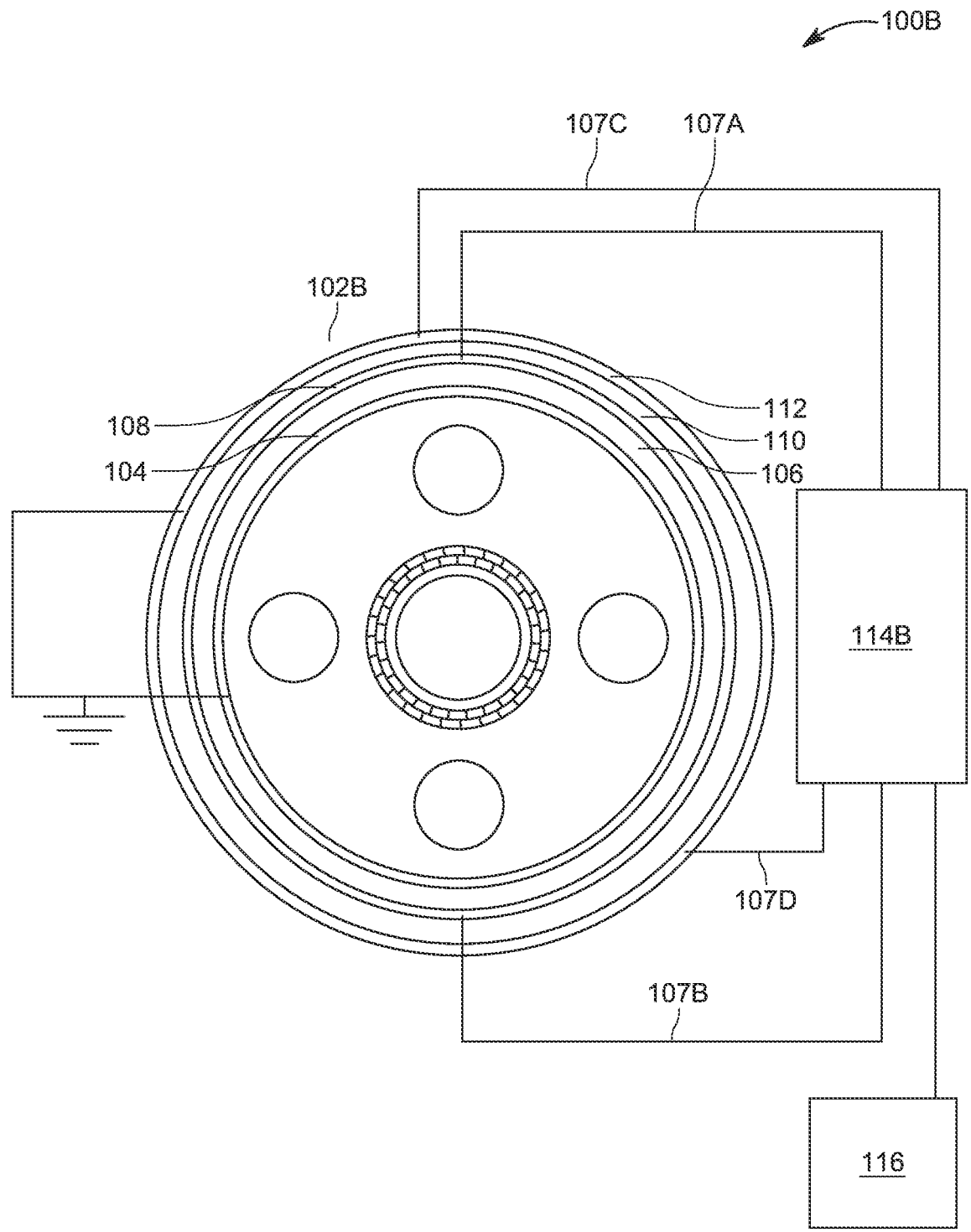

FIGS. 1A and 1B are schematic diagrams of a leak detector according to embodiments. Turning first to FIG. 1A, a leak detector 100A includes a leak sensor 102A. The leak sensor 102A includes a bottom ground plane 104, a porous bottom dielectric substrate 106 arranged on the bottom ground plane 104, a conductor 108 arranged on top of the porous bottom substrate 106, a top dielectric substrate 110 arranged on the conductor 108, and a top ground plane 112 arranged on the top dielectric substrate 110. The leak detector 100A also includes readout circuitry 114A electrically coupled to the conductor 108. The readout circuitry 114A is configured to measure a change in electrical properties in at least the porous bottom dielectric substrate 106. Specifically, as discussed in more detail below, any leaking fluid will infiltrate the pores of the porous bottom dielectric substrate 106, which changes its electrical properties, and thus a change in the electrical properties of the bottom dielectric substrate 106 indicates the presence of leaking fluid.

As also illustrated in FIG. 1A, the readout circuitry 114A is coupled to a wireless transmitter 116, which is configured to transmit an indication of the change in electrical properties in at least the porous bottom dielectric substrate 106. This indication can be the measurement of the change in the electrical properties in at least the porous bottom dielectric substrate 106, an indication of the amount of leaking fluids, and/or a simple indication that leaking fluid has been detected. These measurements can be transmitted by the wireless transmitter 116 on a periodic basis or can be transmitted only when there is a detected change in the electrical properties in at least the porous bottom dielectric substrate 106.

The leak detector 100A illustrated in FIG. 1A and the leak detector 100B illustrated in FIG. 1B have a similar structure, the difference being in how leaking fluid is detected by the readout circuitry. The leak detector 100A illustrated in FIG. 1A is referred to herein as a low-frequency leak detector because the change in the electrical properties in at least the porous bottom dielectric substrate 106 are electrical properties occurring at low frequencies, whereas the leak detector 100B illustrated in FIG. 1B is referred to herein as a high-frequency leak detector because the change in the electrical properties in at least the porous bottom dielectric substrate 106 occur at high frequencies, such as, for example, microwave frequencies.

Figure 1C:
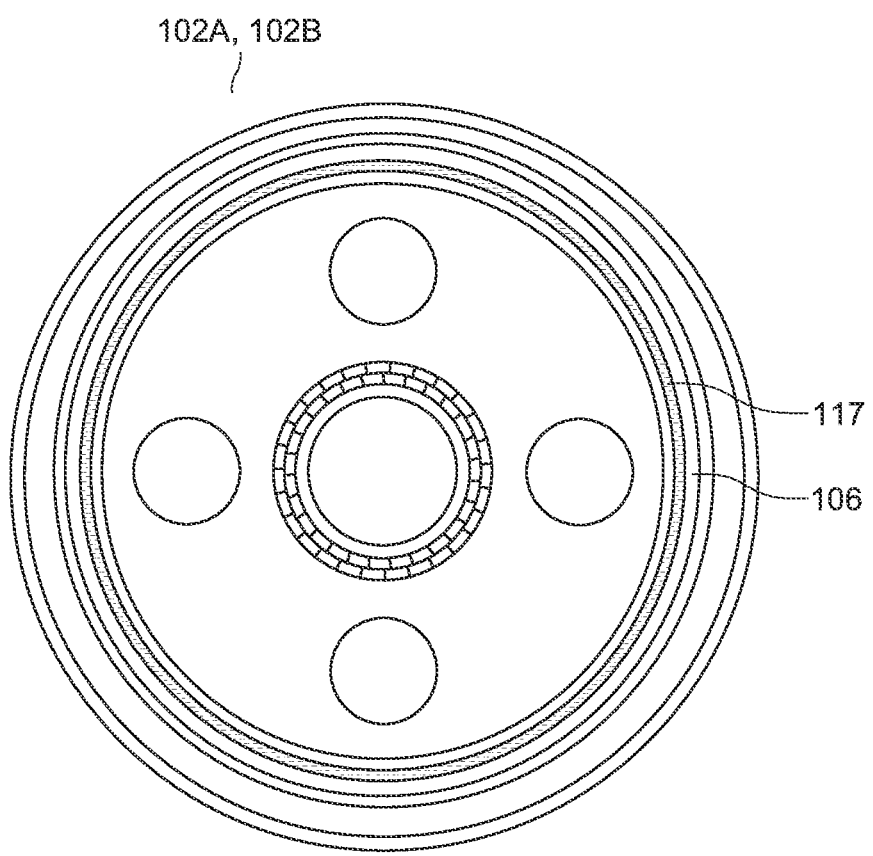

As illustrated in FIG. 1A, the low-frequency leak detector 102A includes a single coupling between the conductor 108 and the readout circuitry 114A. Specifically, the bottom 104 and top 112 ground planes are shorted together and the readout circuitry 114A obtains an electrical signal between the shorted bottom 104 and top 112 ground planes and the conductor 108. In the illustrated embodiment, the low-frequency leak detector 102A operates in capacitance mode and thus measures the dielectric constant of the porous bottom dielectric substrate 106 as the electrical property that is subject to change when a leak is detected. Specifically, as illustrated in FIG. 1C, when a leaking fluid 117 infiltrates the pores of the porous bottom dielectric substrate 106, the dielectric constant of the porous bottom dielectric substrate 106 changes, which can be detected by the readout circuitry 114A by the measurement taken between the conductor 108 and the ground planes 104 and 112. More specifically, the capacitance 109 between the conductor 108 and the grounds planes 104 and 112 (which again are shorted together as illustrated in FIG. 1A) increases proportionally to the amount of fluid infiltrating the porous bottom dielectric substrate 106. Thus, this change of capacitance, which is due to a change in the dielectric constant of the porous bottom dielectric substrate 106, can be determined by providing a capacitance-to-digital converter in the readout circuitry 114A.

The low-frequency leak detector 100A can alternatively be configured to detect the dielectric loss by operating in a resistance mode instead of a capacitance mode. In the resistance mode, the low-frequency leak detector 100A measures the dielectric loss, instead of the dielectric constant, of the porous bottom dielectric substrate 106 by measuring the resistance instead of capacitance.

Turning now to FIG. 1B, the high-frequency leak detector 100B has the same configuration of the bottom ground plane 104, porous bottom dielectric substrate 106, conductor 108, top dielectric substrate 110, and top ground plane 112 as the low-frequency leak detector 100A. The manner of connecting the readout circuitry 114B is different in the high-frequency leak detector 100B than in the low-frequency leak detector 100A. Specifically, the low-frequency leak detector 100A detects only a single electrical property (i.e., either dielectric constant or dielectric loss) of the porous bottom dielectric substrate 106, whereas the high-frequency leak detector 100B simultaneously detects both dielectric constant and dielectric loss. This is achieved by providing two signal couplings 107A and 107B (also referred to herein as feedlines) between the readout circuitry 114B and the conductor 108, one of the coupling supplying a microwave signal to the conductor 108. As described in more detail below, signal couplings 107A and 107B are directly coupled to feedlines, which are capacitively coupled with conductor 108 so that signal couplings 107A and 107B are capacitively coupled to the conductor 108. Further, the readout circuitry 114B has a ground couplings 107C and 107D to the top ground plane 112 so that the readout from the signal coupling 107A is with reference to the ground plane 112 (via the ground coupling 107C) and so that the readout from the signal coupling 107B is with reference to the ground plane 112 (via the ground coupling 107D).

The high-frequency leak detector 100B includes a leak sensor 102B that is a microwave ring-resonator operating in asymmetric stripline mode, which those skilled in the art will recognize is a transmission mode in which the microwave signal line is sandwiched between two parallel ground planes. Although embodiments are described in connection with the use of a microwave ring-resonator, other embodiments can employ any type of planar resonator (e.g., a ring resonator, a T-shaped resonator, etc.) that can be wrapped around a structure that is subject to fluid leaks.

Turning again to FIG. 1C, as fluid 117 infiltrates the pores of the porous bottom dielectric substrate 106, the effective dielectric constant $\varepsilon_{eff}$ increases, which is due to the fact that microwaves travel slowly through any medium other than air by a factor of $\sqrt{\epsilon_r \mu_r}$, where $\epsilon_r$ and $\mu_r$ are the relative permittivity and relative permeability of the medium, respectively. The guided wavelength $\lambda_g$ decreases by the same factor that effectively increases the electrical size of the ring. As the resonant frequency $f_0$ of the ring is inversely proportional to its electrical size, $f_0$ decreases in the presence of any dielectric medium other than air. Because the porous bottom dielectric substrate 106 has pores that normally contain air, any infiltration of the pores by a fluid, such as, for example, water, oil, etc., increases the effective dielectric constant $\epsilon_{eff}$ of the porous bottom dielectric substrate 106, which causes the resonant frequency $f_0$ of the ring resonator to shift towards a lower frequency. Accordingly, the readout circuitry 114B can include an oscillator to continuously monitor the resonant frequency $f_0$ of the ring resonator in order to detect any changes. One particular advantage of operating the ring resonator in a stripline mode is that the top ground plane 112 shields the leak sensor 102B from the environment, and thus prevents environmental fluid or dust from infiltrating the pores of the porous bottom dielectric substrate 106.

In the illustrated embodiment, one of the signal couplings 107A and 107B between the readout circuitry 114B and the conductor 108 is an input port and the other is an output port. Thus, in this embodiment the readout circuitry 114B also includes the necessary drive circuitry to provide the microwave signal. Alternatively, separate drive circuitry (not illustrated) can be provided. In operation, a microwave signal is fed to the input port using a capacitively fed feedline, which also operates in stripline mode. Although in the illustrated embodiment the input and output ports are offset by 180°, other angular separations (such as integer multiples of 90°) between the input and output ports can be employed. These other angular separations can also be used to achieve a desired response from the sensor to facilitate the integration of the sensor with oscillator-based readout circuitry. Because the transmission between the input and output ports becomes maximum when the physical length (i.e., circumference) of the ring (i.e., conductor 108) becomes an integer multiple of the guided wavelength as outlined in Equation 1 below, either the physical size or the guided wavelength can be fixed and the other parameter varied to achieve the maximum output. When, as discussed in more detail below, the leak sensor 102A or 102B is arranged to detect leaks from flanges, the sizes of the flanges will be predetermined, and thus the particular frequency provided at the input port can be selected to achieve a maximum output based on this fixed size.

$$2\pi R = n\lambda_g \quad (1)$$

where R represents the circumference of the ring (i.e., conductor 108).

Figure 2:
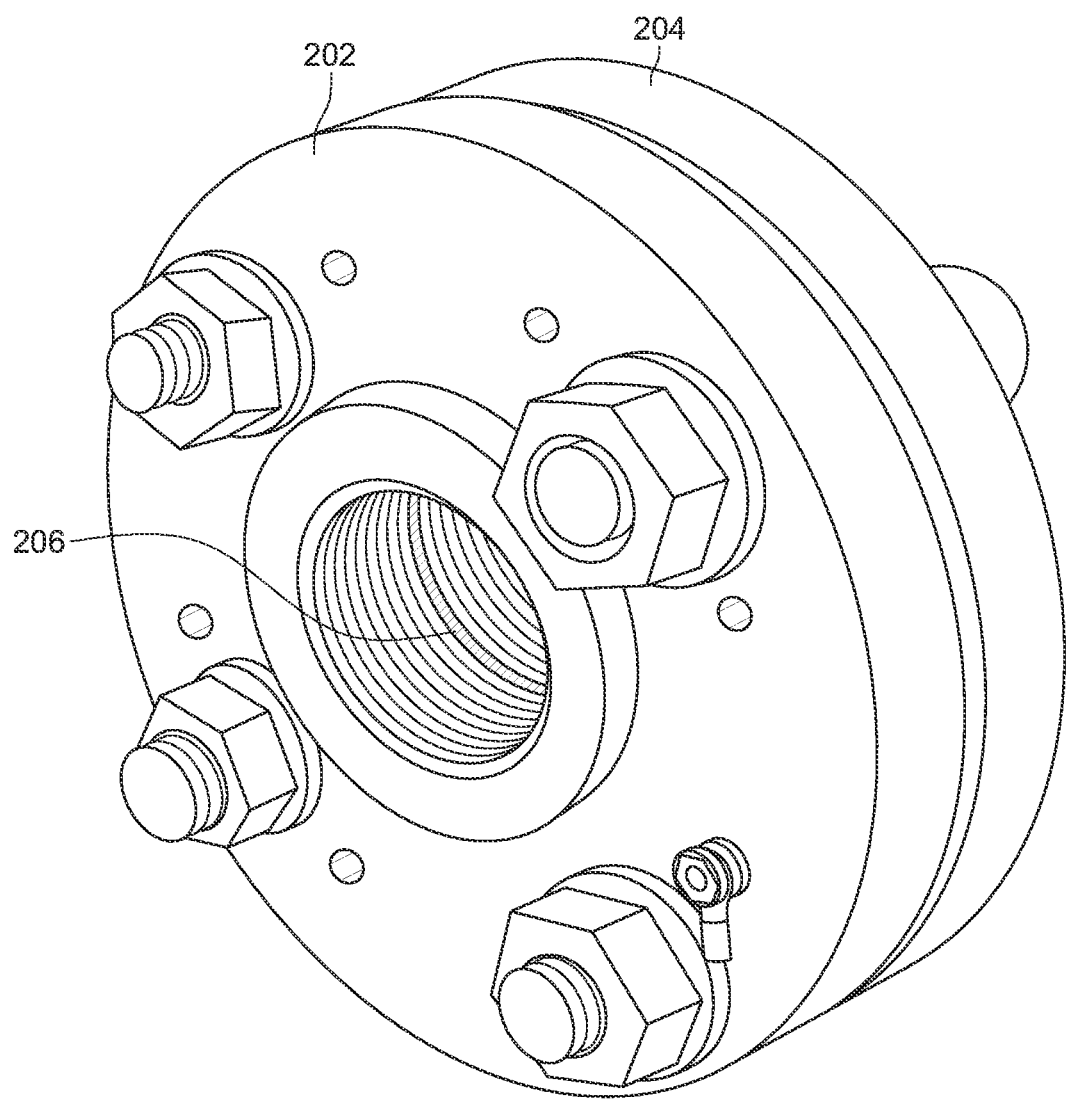
FIG. 2 is a schematic diagram of a pair of flanges spaced apart by a gasket according to embodiment.

An embodiment of the disclosed leak detector can involve detecting leaks from, for example, water or oil pipelines. These pipelines include pipes that are physically coupled to each other by a pair of flanges and a gasket. One example of this physical coupling is illustrated in FIG. 2. As illustrated, two flanges 202 and 204 are arranged next to each other and a gasket 206 is arranged between them in the center of the flanges 202 and 204, which is an area for the passage of fluid between two pipes (not illustrated). In the illustrated embodiment the gasket 206 is an O-ring. The two flanges 202 and 204 are physically coupled to each other by a number of bolts and nuts, which is four each in the illustrated example. As will be discussed in more detail below, the flanges 202 and 204 also serve as the bottom ground plane, and thus the flanges 202 and 204 can be considered as part of both the fluid transportation system and the leak detector.

Figure 3:
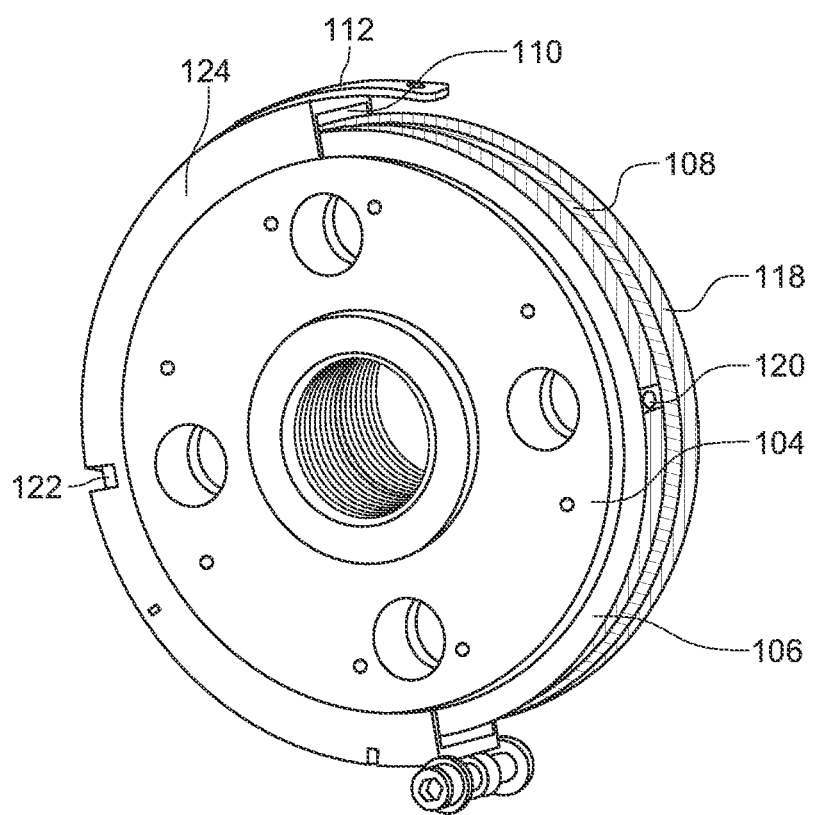
FIG. 3 is a schematic diagram of a leak detection sensor according to embodiments.

One example implementation of the leak sensor 102B of FIG. 1B will now be described in connection with FIG. 3. In this particular implementation, the flanges 202 and 204 (not labeled in the figure) are the bottom ground plane 104, and thus the porous bottom dielectric substrate 106 is arranged over the gap between the flanges 202 and 204 so that any fluid leaking from the joint between the flanges 202 and 204 will infiltrate the pores of the porous bottom dielectric substrate 106. The conductor 108 is supported on a carrier 118, which is interposed between the conductor 108 and the porous bottom dielectric substrate 106. Also illustrated are the input and output ports 120 and 122 (either one can serve as the input or output port and then the other serves as the output or input port) for connecting the drive signal and reading out the resonant frequency. The top ground plane 112 is in the form of a hinged clamp having side walls 124 that are electrically coupled to the flanges 202 and 204, and thus the bottom 104 and top 112 ground planes are grounded to each other. Further, the sidewalls 124 enclose the top dielectric substrate 110. A low-frequency leak sensor 102A would be configured similarly except that it would not have an input and output port but instead only an output port, which is not capacitively coupled with the conductor 108 (as in the case of the high-frequency leak sensor 102B) but instead the output port is directly electrically connected with the conductor 108.

As will be appreciated from the discussion of FIGS. 1A-3 above, a leak detection system is provided. The leak detection system includes first 202 and second 204 flanges spaced apart by a gasket 206. The leak detection system also includes a leak sensor 102A or 102B. The leak sensor 102A or 102B includes a bottom ground plane 104 formed by the first 202 and second 204 flanges, a porous bottom dielectric substrate 106 arranged on the bottom ground plane 104, a conductor 108 arranged on the porous bottom substrate 106, a top dielectric substrate 110 arranged on the conductor 108, and a top ground plane 112 arranged on the top dielectric substrate 110. The top ground plane 112 is a clamp that clamps the leak sensor to the first 202 and second 204 flanges so that a space between the first 202 and second 204 flanges is protected from an environment external to the leak sensor 102A or 102B. The leak detection system also includes readout circuitry 114A or 114B electrically coupled to the conductor 108. The readout circuitry 114A or 114B is configured to measure a change in electrical properties in at least the porous bottom dielectric substrate 106. The leak detection system also includes a wireless transmitter coupled 116 to the readout circuitry 114A or 114B. The wireless transmitter 116 is configured to transmit an indication of the change in electrical properties in at least the porous bottom dielectric substrate 106.

The readout circuitry 114A and 114B can be implemented in a number of different manners. In one implementation the readout circuitry 114A and 114B can be configured to measure changes in the electrical properties in the porous bottom dielectric substrate and then communicate this information to a centralized location for further processing, such as determining the amount of leakage based on the received measurements. In this case, the measurements are provided along with an identifier of the location of the particular leak detection system that is providing the measurements. In another implementation, the readout circuitry 114A and 114B can process the measurements prior to transmitting them, along with a location identifier, to a centralized location so that the amount of leaked fluid is provided instead of, or in addition to, the raw measurements.

The leak detection system has a very low power requirement and can be powered, for example, by a rechargeable battery coupled to a small solar panel. This is particularly advantageous because it allows the leak detection system to be operated for a long period of time without requiring frequent replacement of the battery powering the system, which can be expensive due to the fact that most pipelines are located far from populated areas.

Although FIGS. 1A-3 illustrate the flanges and leak sensor as being circular, the flanges and leak sensor can take the form of any shape. Specifically, the disclosed leak sensor can conform to the shape of any structure for which it is desired to detect fluid leaks.

Figure 4:
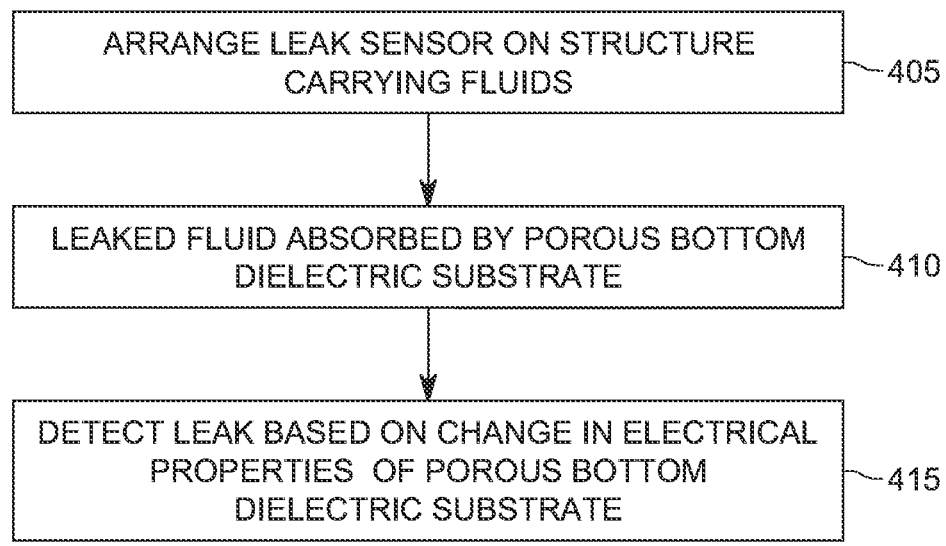
FIG. 4 is a flow diagram of a method for detecting leaks according to embodiments.

A method for detecting leaks will now be described in connection with FIG. 4. A leak sensor 102A or 102B is arranged on a structure carrying fluids (step 405). In an embodiment, the structure is the flanges described above and the leak sensor 102A or 102B is configured as described above. The porous bottom dielectric substrate 106 absorbs leaked fluid, which modifies electrical properties of the porous bottom substrate (step 410). A leak is detected based on a change in electrical properties in at least the porous bottom dielectric substrate 106 (step 415). The manner of detecting a leak based on a change in electrical properties in at least the porous bottom dielectric substrate 106 has been described above in connection with FIGS. 1A-3. The method can further include transmitting an indication of the change in electrical properties in at least the porous bottom dielectric substrate 106, which as discussed above can be the measured electrical property, processed data based on the measured electrical property, and/or an indication of whether a change has been detected. Further, as also discussed above, the transmission of the indication can be periodically or can be performed only when a leak is detected.

Figure 5A:
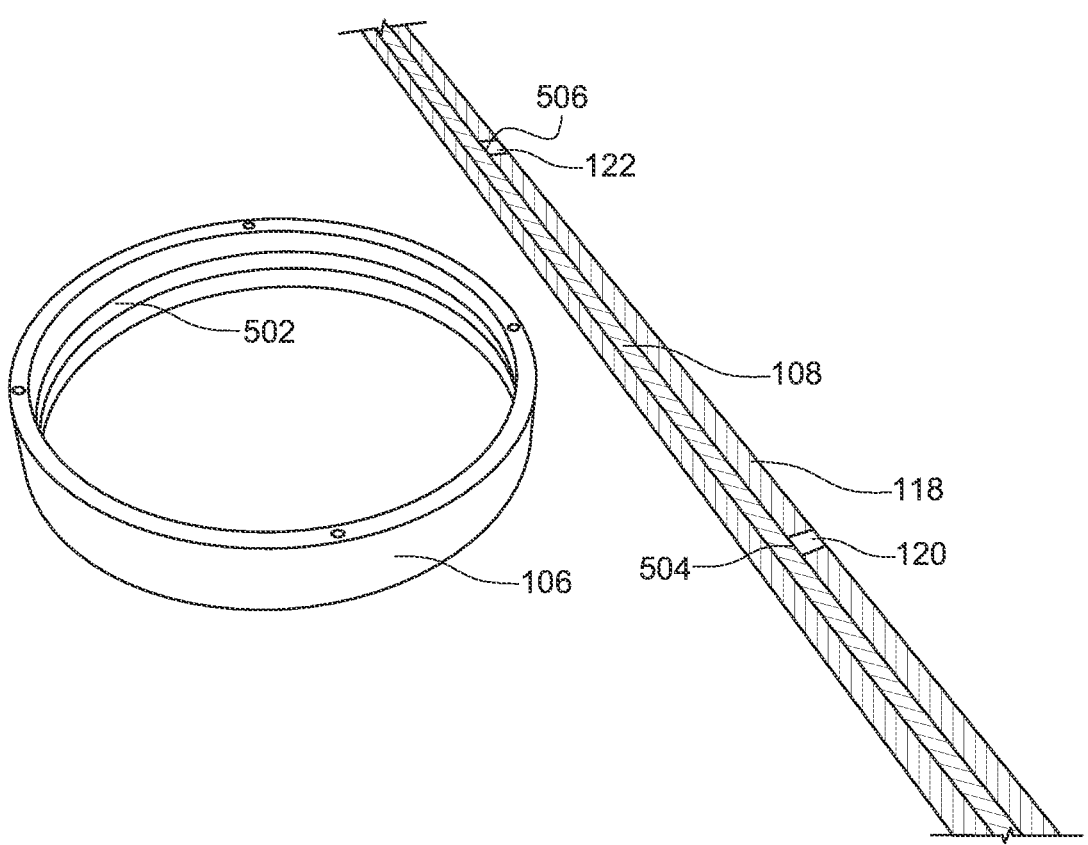
FIG. 5A is a schematic diagram of one type of porous bottom dielectric substrate and a conductor according to embodiments.

An example of a method of making a leak sensor 102A or 102B will now be described in connection with FIGS. 5A-5C. FIG. 5A illustrates an example of a porous bottom dielectric substrate 106 and conductor 108 formed on a carrier 118. In an embodiment, the porous bottom dielectric substrate 106 can be formed, for example, using three-dimensional printing. In the illustrated embodiment, a channel 502 is formed on the inner periphery of the porous bottom dielectric substrate 106 to achieve the pores that can be infiltrated by fluid. However, the porous bottom dielectric substrate 106 can be made porous in any manner.

In an embodiment, the carrier 118 can be, for example, 125 μm thick polyimide layer, such as Kapton tape, and the conductor 108 can be, for example, ink jet printed silver nanoparticles on the carrier 118. In an embodiment, the carrier 118 can be cleaned using, for example, ethanol and the conductor 108 can be formed by, for example, printing four layers of silver nanoparticles using a 10 pL cartridge and 40 μm drop spacing. In order to achieve good conductivity, the conductor 108 and carrier 118 can then be cured, for example, at 140° C. for 30 minutes. The illustrated carrier 118 includes two feedlines 120 and 122, and thus is configured for use as a high-frequency leak detector, such as the one discussed above in connection with FIG. 1B. If the carrier is employed for a low-frequency leak detector, such as the one discussed above in connection with FIG. 1A, one of the feedlines can be omitted and the other feedline can be electrically connected with the central conductor. There is one additional difference between the low- and high-frequency leak detectors. As illustrated in FIG. 5A, there is a gap 504 and 506 formed between the feedlines 120 and 122, respectively, and the conductor 108. In contrast, in a low-frequency leak detector, there is no gap between the single feedline and the conductor 108, i.e., the single feedline is directly coupled to the conductor 108.

Figure 5B:
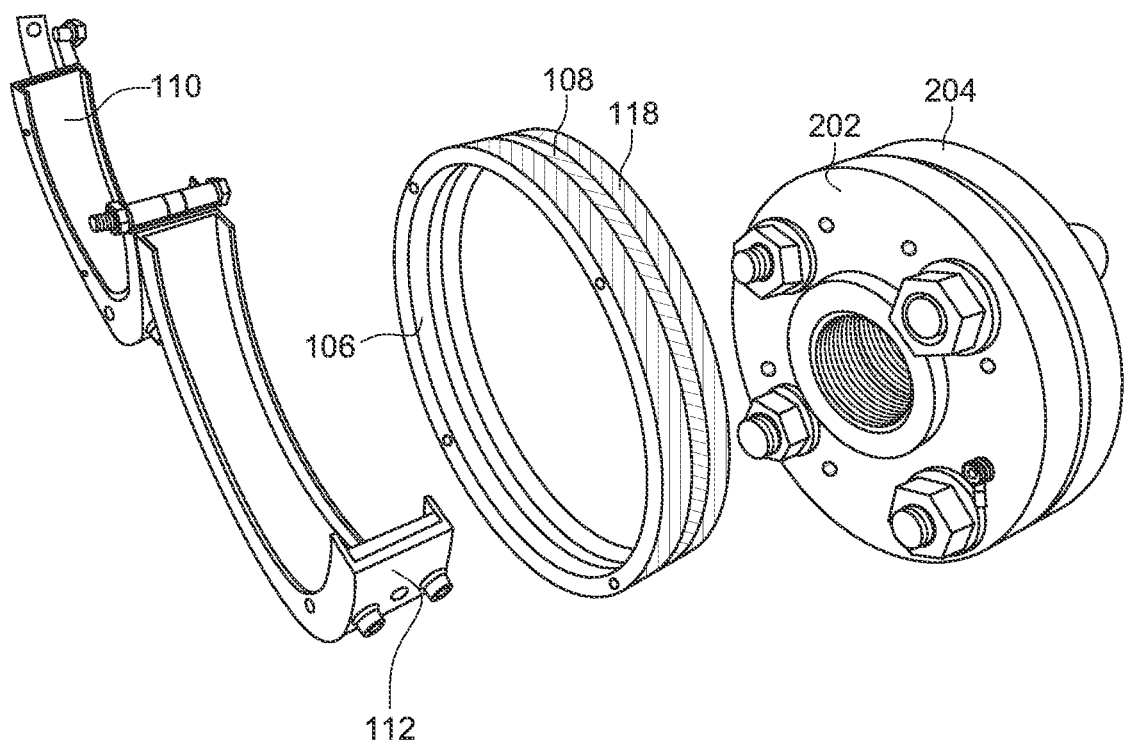
FIG. 5B is a schematic diagram of components of a leak sensor according to embodiments.

Turning now to FIG. 5B, after curing, the conductor 108 and carrier 118 are wrapped around the porous bottom dielectric substrate 106. The top dielectric substrate 110 is arranged inside of the top ground plane 112, which is in the form of a protective clamp. The protective clamp can be formed, for example, using 3-axis milling and wire electrical discharge machining. The top dielectric substrate 110 can be composed of, for example, polyvinyl chloride (PVC).

Figure 5C:
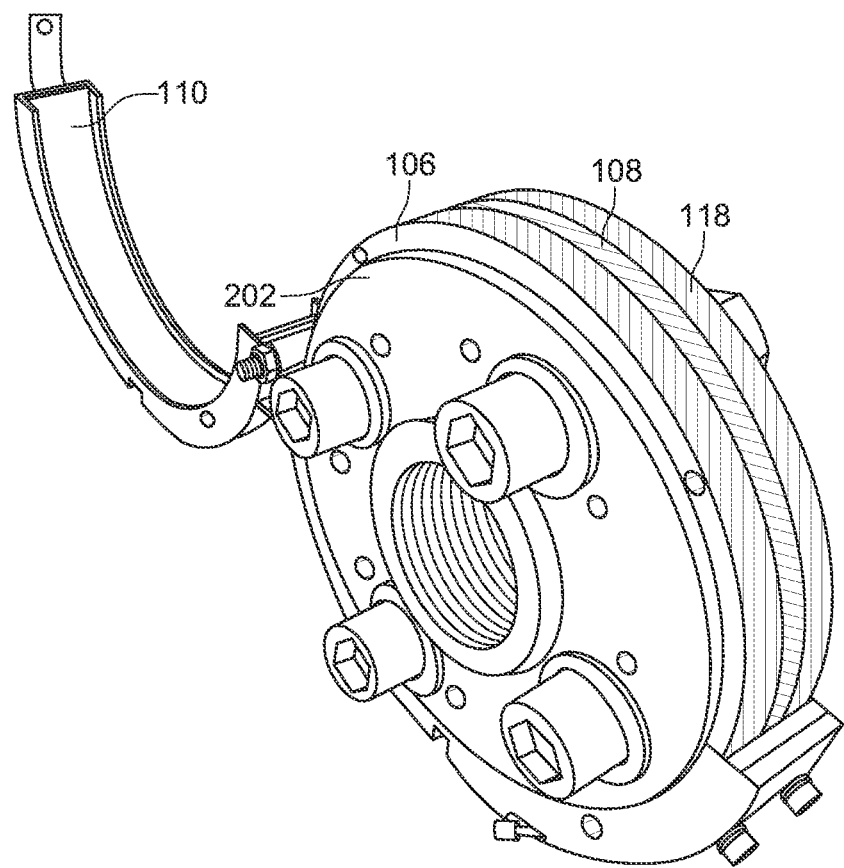
FIG. 5C is a schematic diagram of a partially assembled leak sensor according to embodiments.

Referring now to both FIGS. 5B and 5C, the carrier 118 and conductor 108 are initially wrapped around the flanges 202 and 204, and then the protective clamp is arranged on top of the conductor 108 and carrier 118 and clamped to seal the leak sensor from the environment. Using ink jet printing to form the conductor and 3D printing to form the porous bottom dielectric substrate allows the production of the disclosed leak detector at a significantly lower cost than conventional leak detectors. This is significant because of the number of locations at which a leak detector should be placed along a pipeline to ensure that leaks are discovered quickly before significant adverse environmental effects occur due to the leak. It should be recognized that the particular materials and sizes are merely one example and the leak detector can be implemented using other materials having sizes different from what is specifically disclosed above.

A high-frequency leak detector constructed as discussed above in connection with FIGS. 5A-5C was subjected to evaluation for the effectiveness of detecting leaks. The evaluation demonstrated the ability of the high-frequency leak detector to detect leaks as low as 0.3 mL, which is a significantly smaller volume of fluid than can be detected using conventional leak detectors. Thus, the disclosed leak detector can more quickly identify leaks compared to conventional leak detectors, and in turn allow the leak to be addressed before the leaking fluid causes significant environmental effects. The high-frequency leak detector can operate at the pressures and temperatures that are typically experienced by pipelines. Specifically, the materials employed, such as steel for the hinged clamp, Kapton tape as the carrier and silver ink, can withstand temperatures as high as 125° C.

Although embodiments have been discussed in connection with the leak detector detecting the presence of a leak, the leak detector can also determine the amount of leaked fluid, as well as the type of leaked fluid. The amount and type of leaked fluid can be determined based on the changes of the dielectric constant and the dielectric loss of the porous bottom dielectric substrate. In the high-frequency leak detector, the amount of leaked fluid is determined based on the amount of shift in the resonance frequency and in the low-frequency leak detector the amount of leaked fluid is determined based on the change in capacitance.

The description above focused on a single leak detector. It should be recognized that pipelines are typically quite long and include a number of flanges connecting individual pipe segments. Accordingly, the disclosed leak detector can be deployed on each of the flanges along a pipeline. In this case, the wireless transmitters of corresponding leak detection system can provide the indication of a change of electrical properties directly to a centralized receiver (e.g., a wireless macro network receiver, typically referred to as a base station) or the indication of a change can be provided from one leak detection system to another along the pipeline so that a leak detection system can provide the indication of a change in electrical properties for a number of leak detectors along a pipeline. The manner of providing the indication can depend upon the availability of a centralized receiver, the costs and power requirements for providing the indications to a centralized receiver versus to another leak detection system along the pipeline, etc.

The disclosed embodiments provide a leak detector. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A leak detector, comprising:
   a leak sensor, comprising
      a bottom ground plane;
      a porous bottom dielectric substrate arranged on the bottom ground plane;
      a conductor arranged on the porous bottom substrate;
      a top dielectric substrate arranged on the conductor; and
      a top ground plane arranged on the top dielectric substrate; and
   readout circuitry electrically coupled to the conductor, wherein the readout circuitry is configured to measure a change in electrical properties in at least the porous bottom dielectric substrate,
   wherein the bottom ground plane and the top ground plane are grounded and connected together to a first feedline of the readout circuitry and the conductor is connected to a second feedline of the readout circuitry.

2. The leak detector of claim 1, wherein the leak sensor is circular.

3. The leak detector of claim 1, wherein the conductor is coupled only with the second feedline to the readout circuitry and the change in electrical properties is a change of capacitance.

4. The leak detector of claim 3, wherein the second feedline is directly electrically coupled to the conductor.

5. The leak detector of claim 1, wherein the conductor is coupled with the second feedline and a third feedline to the readout circuitry and the change in electrical properties is a change in dielectric constant and a change in dielectric loss of the porous bottom dielectric substrate.

6. The leak detector of claim 5, wherein there is a gap between each of the first and second feedlines and the conductor so that the second and third feedlines are capacitively coupled to the conductor.

7. The leak detector of claim 1, wherein the top and bottom ground planes are electrically shorted with each other.

8. The leak detector of claim 1, wherein the bottom ground plane is at least one flange and the top ground plane is a metallic clamp configured to clamp the leak sensor on the at least one flange.

9. The leak detector of claim 8, wherein the bottom ground plane comprises two flanges, each having a passage for fluid and a gasket arranged between the two flanges in an area of the passage for fluid.

10. The leak detector of claim 1, wherein the conductor is carried on a polyimide layer that is interposed between the conductor and the bottom porous dielectric substrate.

11. A leak detection system, comprising:
   first and second flanges spaced apart by a gasket;
   a leak sensor, comprising
      a bottom ground plane formed by the first and second flanges;
      a porous bottom dielectric substrate arranged on the bottom ground plane;
      a conductor arranged on the porous bottom substrate;
      a top dielectric substrate arranged on the conductor; and
      a top ground plane arranged on the top dielectric substrate, wherein the top ground plane is a clamp that clamps the leak sensor to the first and second flanges so that a space between the first and second flanges is protected from an environment external to the leak sensor;
   readout circuitry electrically coupled to the conductor, wherein the readout circuitry is configured to measure a change in electrical properties in at least the porous bottom dielectric substrate; and
   a wireless transmitter coupled to the readout circuitry, wherein the wireless transmitter is configured to transmit an indication of the change in electrical properties in at least the porous bottom dielectric substrate.

12. The leak detection system of claim 11, wherein the flanges and leak sensor are circular.

13. The leak detection system of claim 11, wherein the leak sensor comprises a single electrical feedline coupled to the readout circuitry and the change in electrical properties is a change of capacitance.

14. The leak detection system of claim 13, wherein the single electrical feedline is directly electrically coupled to the conductor.

15. The leak detection system of claim 11, wherein the leak sensor comprises two electrical feedlines coupled to the readout circuitry and the change in electrical properties is a change in dielectric constant and a change in dielectric loss of the porous bottom dielectric substrate.

16. The leak detection system of claim 15, wherein there is a gap between each of the two electrical feedlines and the conductor so that the two electrical feedlines are capacitively coupled to the conductor.

17. A method for detecting leaks, the method comprising:
   arranging a leak sensor on a structure carrying fluids, wherein the leak sensor comprises
      a bottom ground plane;
      a porous bottom dielectric substrate arranged on the bottom ground plane;
      a conductor arranged on the porous bottom substrate;

a top dielectric substrate arranged on the conductor; and a top ground plane arranged on the top dielectric substrate; and absorbing leaked fluid by the porous bottom dielectric substrate, the absorbed leaked fluid modifying electrical properties of the porous bottom substrate; and detecting a leak with readout circuitry, based on a change in electrical properties in at least the porous bottom dielectric substrate, wherein the bottom ground plane and the top ground plane are grounded and connected together to a first feedline of the readout circuitry and the conductor is connected to a second feedline of the readout circuitry.

18. The method of claim 17, further comprising:
detecting an amount of leaked fluid based on the change in electrical properties in at least the porous bottom dielectric substrate.

19. The method of claim 17, wherein the detection of the leak comprises detecting a change in dielectric constant of the porous bottom dielectric substrate.

20. The method of claim 17, wherein the detection of the leak comprises detecting a change in dielectric loss of the porous bottom dielectric substrate.

* * * * *